United States Patent

Loughran

[15] 3,687,068

[45] Aug. 29, 1972

[54] BALING PRESS BALE RELEASING MEANS

[72] Inventor: Anthony Loughran, 20 Springbank Drive, Farsley, Pudsey, Yorkshire, England

[22] Filed: Jan. 12, 1970

[21] Appl. No.: 2,298

[52] U.S. Cl. ....................... 100/255, 100/3, 100/226, 100/269 R

[51] Int. Cl. ............................. B30b 1/32, B30b 7/00

[58] Field of Search .......... 100/218, 226, 3, 255, 252, 100/269, 246

[56] References Cited

UNITED STATES PATENTS

| | | | |
|---|---|---|---|
| 1,058,611 | 4/1913 | Lowman | 100/255 X |
| 1,090,257 | 3/1914 | Walter | 100/255 X |
| 1,194,624 | 8/1916 | Hanus et al. | 100/255 |
| 3,548,744 | 12/1970 | Van Doorn et al. | 100/255 |
| 2,757,603 | 8/1956 | Wilson et al. | 100/226 |
| 3,413,913 | 12/1968 | Smedlund | 100/226 X |
| 3,438,321 | 4/1969 | Gladwin | 100/226 |

*Primary Examiner*—Billy J. Wilhite
*Attorney*—John Cyril Malloy

[57] ABSTRACT

An improvement invention incorporated in a baling press having a press box defining a generally rectangular bale pressing chamber, a press platen vertically reciprocatingly operative in the upper interior of the bale pressing chamber and having a door or front wall of the press box hingedly operable in horizontal swinging movement for access into the bale pressing chamber. The improvement includes providing means for articulatingly interconnecting a sidewall of the press box for freeing the bale of compacted waste material from the press box after the bale is formed, and includes latch means for maintaining the front wall and sidewall in right angular latched configuration while the bale is being formed.

7 Claims, 4 Drawing Figures

INVENTOR.
ANTHONY LOUGHRAN

BY John Cyril Malloy

ATTORNEY.

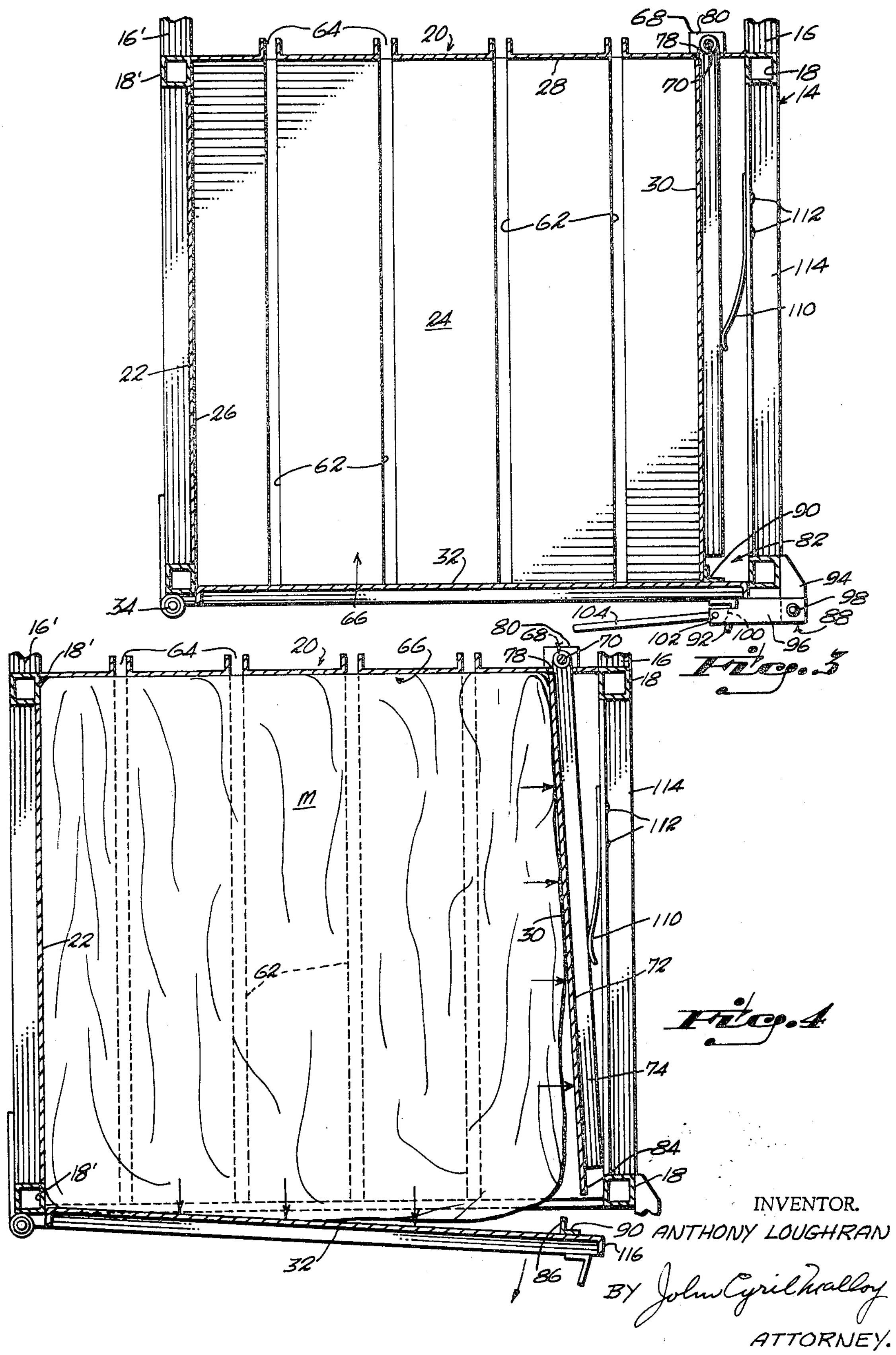
INVENTOR.
ANTHONY LOUGHRAN
BY John Cyril Malloy
ATTORNEY.

BALING PRESS BALE RELEASING MEANS

CROSS REFERENCE TO RELATED APPLICATION

This is an improvement on my earlier invention U. S. application Ser. No. 859,309, entitled Baling Press, filed Sept. 19, 1969, now U.S. Letters Patent 3,613,567, issued Oct. 19, 1971.

BACKGROUND OF THE INVENTION

1. Field of Invention

The invention relates to bale-forming press machines generally and particularly relates to the mechanism in a baling press operative for releasably freeing a press-formed bale unit from the press chamber of the machine.

2. Description of the Prior Art

The conventional bale press machine includes a press box having displaceable front and rear press box walls for permitting a pressed bale in the machine to be removed therefrom by exerting pressure on the backside of the bale and pushing it forwardly and through the open front door or front wall of the press box. U.S. Pat. No. 1,646,355 illustrates one such bale pressing machine having oppositely opening front and back wall portions of the press box and permitting the pressed bale to be ejected forwardly and through the front door of the press box by pressing forwardly through the open rear door. In a press box of typical construction, the confronting sidewalls are stationarily parallel arranged and exert a clamping effect on the finished bale and cause the bale to be difficult to remove from the interior of the press box when open. Another problem of particular import in prior art baling press machines concerns the manner in which the compacted baled material is lashed or bound with wire or cord material while the bale is in a compressed compact disposition in the bale press chamber. In the typical baling press having front and rear displacement door units, the baling wire or cord material is threaded through channelways provided in the press box construction at the top and bottom of the bale; each strand of baling wire or the like is typically looped around the compressed bale material and is knotted or tied at a side of the bale through access means provided by displacement of the front and back walls of the bale press box. Since, in the above-described procedure, the bale material is compressed vertically and with the front and back sides of the bale bulging oppositely, the baled material may not be tied tightly and compactly. Certain prior art baling press machines are provided with a press box having only access means on the front face and including a press box having a hinged or displaceable front wall panel. My earlier application Ser. No. 859,309 and U.S. Pat. No. 2,757,603 each illustrate a press box having displaceable door or front wall access means to the interior of the press box structure. Typically, such constructions include back wall panels having vertical slot means for passage of the loops of baling wire around the compressed bale material while it is in the press box chamber. Although the three-sided press box structure having a slotted back wall affords means for forming a more dense and compact bale of material, such construction presents a problem in ejecting or removing the finished bale from the bale chamber. Since the bale may not be pressed out from the rearward side of the press chamber, the operator of the prior art machines may be provided with hand-grasped hook means for hooking the baled material in retrieving or drawing it through the open front of the press box. Such operating procedures are awkward and inefficient and not infrequently, a bale of material may be broken or removed from the baling machine in such a loosened or noncompacted disposition that it may separate or come apart during transit or manipulation.

SUMMARY OF THE INVENTION

The instant invention obviates many of the above-mentioned disadvantageous features of the prior art baling machine structures and provides a three-sided press box chamber during the bale-tying procedure and which affords a tightly tied compact bale unit. The press box construction of the instant invention permits releasing a tied compacted bale unit horizontally, both lengthwise and depthwise; the press box construction provides displaceable front and side press box wall structure, freeing both the lateral and longitudinal clamping actions on a tied compacted bale unit thereby permitting easy ejection and removal of the bale unit from the press box interior. Additionally, the press box construction of the instant invention affords means for forming a more dense and compact bale unit which may be easily removed from the baling chamber without the use of hook means or the like. The baling machine of the instant invention is operative for repetitiously forming tightly-tied bales of material which may withstand repeated manipulations or handling in transit.

BRIEF DESCRIPTION OF THE DRAWING

FIG. 3 is a horizontal plane sectional view of the press box structure taken as on the line 3—3 of FIG. 2 and looking in the direction of the arrows; and FIG. 4 is a view similar to FIG. 3, but illustrating a mass of bale material within the baling chamber, and further illustrating the front and sidewall panels as being displaced outwardly and loosened from the bale material.

DESCRIPTION OF THE PREFERRED EMBODIMENT

Figure 1:
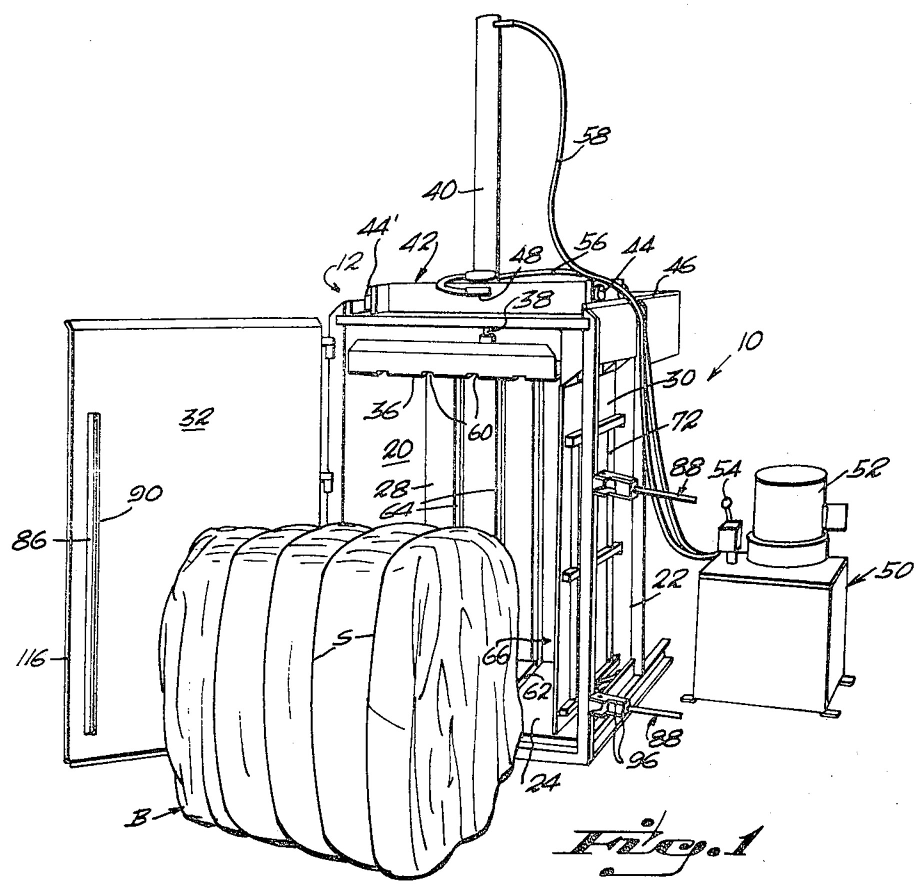
FIG. 1 is a front perspective view of a baling press machine having incorporated therein the bale releasing means of the instant invention.

A baling apparatus incorporating the instant invention is indicated by numeral 10 and is shown and described as being incorporated in a baling press 12 including laterally symmetrical frame structure 14 including horizontal frame base members 16, 16' and vertical frame members 18, 18; 18', 18' and including a press box 20 including a press box body 22 including a horizontal bottom 24 and upstanding sidewalls 26, 28, 30. The press box 20 includes a door or front wall 32 hingedly supported on the forward edge of sidewall 26 by hinge means 34 and with the front wall 32 being adapted to horizontally swing to and from open and closed dispositions respectively away from and over the open front of the press box body 22 (see respectively FIGS. 1 and 3). The baling press 12 further includes a horizontal platen 36 supported on the lower end of a piston rod 38 of a hydraulic ram assembly 40 fixedly supported in upstanding disposition on a carriage 42 runningly elevatingly supported by frame structure 14 superjacently of press box 20. Paired carriage wheels 44, 44; 44′, 44′ runningly engage horizontal parallel extending rails 46, 46′ fixedly secured on the upper end portion of vertical frame members 18, 18; 18′, 18′. Rail members 46, 46′ project cantilever fashion rearwardly respectively of press box 20 and provide offset trackway means for permitting fore-and-aft movement of carriage 42 and horizontal displacement of platen 36 from the interior of the press box structure. Hand-grip means 48 preferably is fixedly secured on the front of carriage 42 for permitting fore-and-aft manual displacement of the carriage and platen. A self-contained hydraulic pumping unit 50 includes pump means, not shown, and electric motor means 52 preferably provides selectively operative power means for actuation of ram assembly 40 and bidirectional movement of platen 36. Selective manipulation of control lever 54 is operative for directing a pressurized flow of fluid through conduits 56, 58 respectively for lifting or lowering the platen 36 during the forming of a bale mass M of waste material. Horizontally extending vertically aligned pairs of channelways 60, 62 formed respectively in platen 36 and bottom 24 of press box 20 provide respectively passageway means for the encircling strands S of baling wire, or the like, in the forming of the compacted bale B of material. The rear wall 28 of the press box is provided with a series of parallel vertical slots 64 in corresponding relation respectively with channels 60, 62; the series of vertical slots 64 provide passageway means for the baling wire strands S and for binding the waste material mass M while it is in a compressed compacted configuration in the lower interior 66 of the baling press box structure.

The bale releasing means of the instant invention preferably includes a vertical series of hinge assemblies 68 including respectively vertically aligned hinge pins 70 articulatingly interconnecting the sidewall 30 of the press box to the stationary rear wall 28. The sidewall 30 includes a planar plate body 72, a plurality of hinge bars 74 fixedly secured on the outer surface of planar wall body 72, and may include vertical stay bars 76 fixedly secured on the outer surface of planar body 72 and reinforcing the sidewall. The rearward portion of each hinge bar 74 projects through a respective aperture 78 formed in stationary rearwall 28 of the press box. A plurality of pairs of hinge tabs 80 fixedly projecting rearwardly from rear wall 28 adjacent respective apertures 78 provides anchor yoke means for hinge pins 70 and permits bidirectional limited pivotal movement of the sidewall 30 relative to the stationary opposite sidewall 26.

Latch means, indicated by numeral 82, provide means for rigidly releasably latching the moveable sidewall 30 and front wall 32 together in right angular relation. The latch means 82 preferably includes coacting abutment catch surfaces 84, 86 formed respectively adjacent the vertical distal edge portions of side and front walls 30, 32; and includes clamp means 88, 88 for releasably maintaining the abutment catch surfaces 84, 86 in abutting relation (See FIGS. 3 and 4). The catch surface 84 preferably is defined by the outer planar surface of plate body 72 adjacent the terminal edge thereof and faces laterally outwardly of the sidewall structure. The abutment catch surface 86 preferably is defined by an abutment angle member 90 fixedly secured vertically on the inside distal portion of the front wall 32. The abutment catch surface 86 faces toward the proximal portion or hinge axis of the front wall 32 and is adapted for coacting engagement with the catch surface 84 of sidewall 30. The relative arrangement of catch surfaces 84, 86 provides means for sequential opening of the side and front walls 30, 32 and defines means facilitating the opening of sidewall 30 only after the front wall 32 has been pivotally displaced forwardly a distance sufficient for disengaging the abutment catch surfaces 84, 86.

Each clamp assembly 88 preferably includes clamp half structure fixedly secured on the distal portion of front wall 32 and preferably in the form of a lug 92 projecting laterally outwardly and canted toward the hinge axis of the front door structure. Coacting clamp half mechanism preferably is supported from frame structure 14 and includes an anchor plate 94 fixedly secured on and projecting forwardly cantilever fashion from the forward one of vertical frame members 18; a parallel pair of clamp bars 96, 96 pivotally secured in horizontal disposition by vertical pin means 98 extending through anchor plate structure 94; a locking cam 100 pivotally secured between the distal end portions of clamp bars 96, 96 by vertical pin means 102; and, a hand lever rod 104 fixedly secured cantilever fashion to locking cam 100 and providing hand-grip means for pivotally manipulating the locking cam between locked and unlocked engagement with the locking lug 92 of front wall 32. FIG. 3 illustrates a clamp assembly 88 in a clamp or locked disposition and with the hand lever rod 104 being in closely spaced disposition from the outer face of front wall 32. Pivotally pulling outwardly on the hand lever rod 104 disengages the locking cam 100 from lug 92 and permits pivotal displacement of the clamp bars 96, 96, the locking cam 100 and hand lever rod 104 outwardly and away from the front face and distal portion of the front wall 32 (see FIG. 1). Arranging both clamp assemblies 88, 88 in a unlocked disposition permits the front wall 32 to be opened or closed as is shown respectively in FIGS. 1 and 3.

Figure 2:
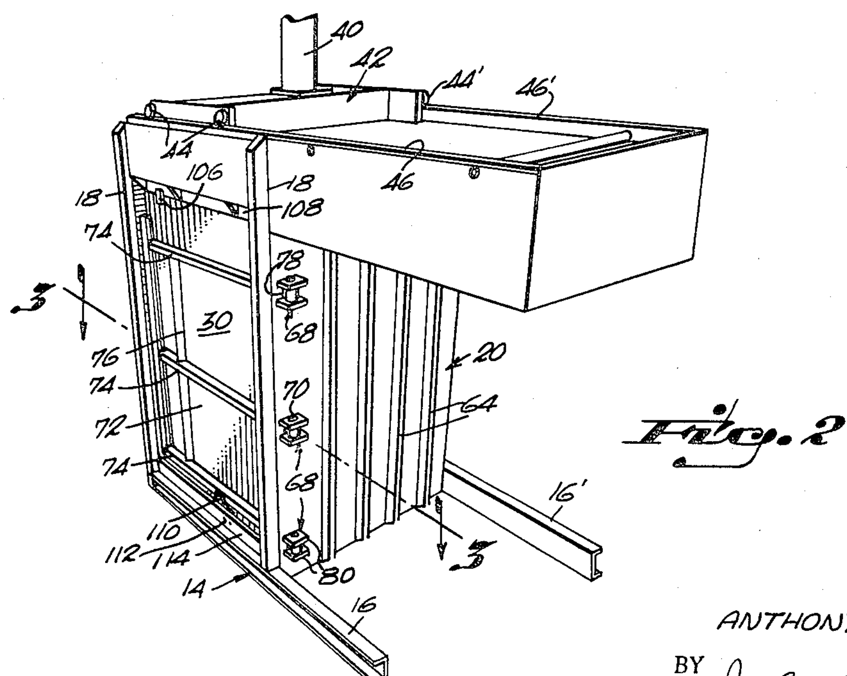
FIG. 2 is generally a rearward perspective view of the baling press structure illustrated in FIG. 1.

Stop means preferably is provided for limiting the pivotal inward movement of sidewall 30 when the press box interior 66 is vacant of the waste material or does not include a mass M of the material. The stop means preferably includes a stop tab 106 fixedly secured on the upper distal edge of the side door 30 and adapted to abuttingly engine the outer surface of a fore-and-aft extending frame member 108 (see FIG. 2). A leaf spring member 110 preferably is anchored by rivet means 112 on the inward side of a lower horizontal frame member 114. The distal portion of spring 110 is adapted to ridingly engage the lowermost hinge bar 74 of the press box sidewall 30 and to pivotally urge the sidewall to a stop disposition with tab 106 engaging horizontal frame member 108. The relative arrangement respectively of side and front walls 30, 32 of the press box and the stop structure 108 preferably is such that the sidewall 30 is stopped at a disposition permitting the catch surface 86 of the front wall angle 90 to pass outside of the abutment surface 84 of sidewall 30 when the front wall 32 is moved to a closed disposition (see FIG. 3).

The front wall 32 preferably is provided with a terminal flange 116 adapted to engage the clamp bars 96, 96 respectively of clamp assemblies 88, 88 when the front wall 32 is closed and the clamp assemblies are in locked configuration. The vertical distal edge of the front door flange portion 116 engages the clamp bars 96, 96 and provides reactive fulcrum means for maintaining the front wall 32 in a closed disposition when the hand lever rods 104, 104 are moved inwardly and the clamp assemblies 88, 88 each are in locked configuration (see FIG. 3).

The wall 30, adjacent portion of press box body 22, planar body 72, hinge bars 72, vertical stay bars 76, abutment surface 84, leaf spring member 110, rivet means 112, and lower frame member 114 are conveniently referred to as a side wall assembly.

While the instant invention has been shown and described herein in what is conceived to be the most practical and preferred embodiment, it is recognized that departures may be made therefrom within the scope of the invention. For example, in certain embodiments of the invention, not shown, the latch means for maintaining the front and side wall structure in a closed right angular configuration may included toggle-type clamp means supported on the vertical forward frame ember 18 in lieu of the clamp assemblies 88, 88. A toggle-type clamping means supported on the vertical frame member 18 may include typical progressive movement type foot means for directly engaging the distal outer surface of the front wall 32 and operative for maintaining the front wall and sidewall in a right angular latched configuration. Also, in certain embodiments of the invention, not shown, the latch means may be fully supported on the pivotal panel structure respectively of the side and front walls 30, 32 and without being supported on the vertical frame structure 18. In such an embodiment, a latch half part may be supported on the sidewall 30 and a corresponding coacting latch half part supported on the front wall 32. The above-mentioned modifications of the preferred structure shown and described in the specification are believed to be well within the purview of a skilled workman in the art.

I claim:

1. In a baling press comprising in combination, a rectangular frame including a base integral with right angularly related, fixed rear and fixed side walls, a front wall hingedly connected at one edge to one edge of said side wall opposite said rear wall for pivotal movement in a horizontal plane, a side wall assembly opposite said fixed side wall and projecting forwardly from said rear wall toward the other edge of said front wall;

means for applying baling straps about a bale formed between said front and rear walls whereby the sides of the bale adjacent said fixed side wall and said side wall assembly are free to expand due to baling pressure when the press is "opened"; latch means at the other edge of said front wall for releasable engagement with a portion of said side wall assembly for releasing a bale after it is formed in the press; and power-platen means operatively connected for bidirectional vertical movement within said press for compacting material and forming a bale therein, the improvement wherein:

said side wall assembly comprises an outer frame portion fixed with respect to said rear wall, a side panel inwardly of said outer frame portion and pivotally supported at a rear edge on said rear wall, said side panel having a forward, free edge positionable adjacent the inner surface of said front wall, spring means extending between said outer frame portion and said side panel for normally urging said side panel inwardly, said front wall including an inwardly projecting abutment engagable in overlapping relation with said side panel adjacent said free edge for restraining said side panel inwardly in conjunction with said spring means for resisting the pressure of a bale formed in the press whereby said side panel is forcibly urged outwardly against said spring means when said front wall is swung outwardly after a compressed bale has been strapped in said press.

2. The structure as claimed in claim 1 in which said side panel is hingedly connected to said rear wall at said rear edge.

3. The structure as claimed in claim 1 in which said side panel has portions projecting through said rear wall and are hingedly connected to said rear wall on a hinge axis rearwardly of said rear wall.

4. The structure as claimed in claim 1 including stop means operatively connected to said side panel for limiting inward movement thereof when material to be baled is absent between said walls.

5. The structure as claimed in claim 1 in which said abutment comprises an angle member secured to and extending vertically of the inner surface of said front wall.

6. The structure as claimed in claim 5 in which said outer frame portion of said side wall assembly comprises a vertical frame member, said front wall including an edge portion substantially in alignment with said vertical frame member when the press is "closed", said latch means including portions displacably overlapping the adjacent edges of said front wall and side wall frame member.

7. The structure as claimed in claim 6 in which said latch means comprises cooperating lock-and-latch portions including a manually-operable cam portion for urging the adjacent edges of the front wall and said vertical frame member together with said free edge of the side panel and the abutment in a relatively stable releasably locked relation.

* * * * *